(12) United States Patent
Favero

(10) Patent No.: US 9,395,094 B2
(45) Date of Patent: Jul. 19, 2016

(54) APPARATUS FOR DEHUMIDIFICATION OF AN AIR FLOW

(71) Applicant: PARKER HANNIFIN MANUFACTURING S.R.L., Corsico (IT)

(72) Inventor: Chiara Favero, Perarolo di Vigonza (IT)

(73) Assignee: PARKER HANNIFIN MANUFACTURING S.R.L., Corsico (IT)

( * ) Notice: Subject to any disclaimer, the term of this patent is extended or adjusted under 35 U.S.C. 154(b) by 219 days.

(21) Appl. No.: 14/374,999

(22) PCT Filed: Mar. 7, 2013

(86) PCT No.: PCT/EP2013/054564
§ 371 (c)(1),
(2) Date: Jul. 28, 2014

(87) PCT Pub. No.: WO2013/139607
PCT Pub. Date: Sep. 26, 2013

(65) Prior Publication Data
US 2015/0000322 A1  Jan. 1, 2015

(30) Foreign Application Priority Data

Mar. 22, 2012 (IT) .............................. PN2012A0015

(51) Int. Cl.
*F24F 3/14* (2006.01)
*B01D 53/26* (2006.01)
(Continued)

(52) U.S. Cl.
CPC ................ *F24F 3/14* (2013.01); *B01D 53/265* (2013.01); *F24F 12/006* (2013.01); *F25D 21/14* (2013.01);
(Continued)

(58) Field of Classification Search
CPC .......... F24F 3/14; F24F 12/006; F25D 21/14; F28F 17/005; B01D 53/265
See application file for complete search history.

(56) References Cited

U.S. PATENT DOCUMENTS 5,275,233 A * 1/1994 Little .................... B01D 53/265
                                                  165/111
5,572,799 A * 11/1996 Masuyuki ............. F24F 3/1423
                                                   34/80

(Continued)

FOREIGN PATENT DOCUMENTS

EP    0 785 399 A2    7/1997
EP    2 096 369 A1    9/2009
(Continued)

OTHER PUBLICATIONS

International Search Report issued in International Patent Application No. PCT/EP2013/054564 dated May 27, 2013.
(Continued)

*Primary Examiner* — Emmanuel Duke
(74) *Attorney, Agent, or Firm* — Oliff PLC

(57) ABSTRACT

Apparatus for dehumidification of a gas flow, with an outer box and inlet port for the damp air and outlet port for dehumidified air, a first pre-cooling heat exchanger, and second heat exchanger downstream of the first exchanger and passes by a refrigerating fluid, a dampness collection chamber arranged downstream of the second exchanger; providing: a second chamber downstream of the collection chamber and connected to the outside box by the emission mouth; a third chamber not communicating to the second chamber but connected, on one side, to the conduits of the first exchanger, and on the other side connected to the outside box by a respective inlet mouth. Defining a return path from the second to the first exchanger, including a first leg passes through the collection chamber, a second leg passes through the second chamber and respective emission mouth, and a third leg passes through the third chamber.

11 Claims, 5 Drawing Sheets

(51) Int. Cl.
  *F24F 12/00* (2006.01)
  *F28F 17/00* (2006.01)
  *F25D 21/14* (2006.01)
  *F28D 21/00* (2006.01)

(52) U.S. Cl.
  CPC ........... *F28F 17/005* (2013.01); *B01D 2257/80* (2013.01); *F28D 2021/0038* (2013.01); *Y02B 30/563* (2013.01)

(56) References Cited

U.S. PATENT DOCUMENTS

| | | | |
|---|---|---|---|
| 5,715,696 A | | 2/1998 | Salvagno et al. |
| 5,727,623 A | * | 3/1998 | Yoshioka ............. B01D 53/265 165/113 |
| 6,131,653 A | * | 10/2000 | Larsson ................... F24F 3/14 165/224 |
| 6,434,963 B1 | | 8/2002 | Urch |
| 7,111,671 B1 | * | 9/2006 | Han ........................ F28D 9/005 165/153 |
| 2007/0029685 A1 | * | 2/2007 | Lin ....................... F24F 3/1417 261/154 |

FOREIGN PATENT DOCUMENTS

| | | |
|---|---|---|
| EP | 2 244 023 A1 | 10/2010 |
| WO | WO 95/03103 A1 | 2/1995 |

OTHER PUBLICATIONS

Written Opinion issued in International Patent Application No. PCT/EP2013/054564 dated May 27, 2013.
Written Opinion issued in Italian Patent Application No. ITPN20120015 dated Mar. 22, 2012 with English language Examiner's Opinion.

* cited by examiner

APPARATUS FOR DEHUMIDIFICATION OF AN AIR FLOW

The present invention is related to an improved apparatus capable of dehumidifying a compressed air flow, with a very low, or almost no percentage of residual dampness, compared to the prior art technique apparatuses.

BACKGROUND

As it is known, gas dehumidifiers, typically compressed air, are mainly used to dehumidify compressed air which is used in a great variety of pneumatic, industrial, etc. uses, which will not be further described as they are well known to the person skilled in the art.

To this purpose, said compressed air, usually supplied as a compressed air flow, is introduced inside said apparatus which comprises an inner path, and, after having been dehumidified, it is re-circulated outside at a substantially unvaried pressure.

Very synthetically, herein it is only reminded that the compressed air flow is caused to flow through a first branch of a heat exchanger, whose second branch is connected to a cooling means, of the known type, and which is its final cooling element, better known as "evaporator".

While passing by said first branch, the compressed air flow is cooled up to a value lower than the dew point; as a direct and desired consequence the dampness contained in the air is condensed and therefore changed into water, generally formed by droplets, which collect on the walls or fall directly down.

Then, after having been separated from the air, because of gravity, said water is collected in the lower part by means of appropriate collecting means.

Finally said water is expelled outside the apparatus by means of suitable conduits and related control means, such as operated valves etc., known per se.

Various apparatuses apt of carrying out the dehumidification process of a compressed air flow have been devised and are currently actuated.

Common element and characteristic of such apparatuses consist in that not only one but two heat exchangers are used; the first heat exchanger, which does not contain said evaporator, is an exchanger of the gas/gas type.

A first branch is caused to be passed by the still warm and damp air flow before being introduced into said first exchanger; the relative second branch is caused to be passed by the air flow exiting the first heat exchanger.

The function of said first exchanger is double and known:

The first function is that of pre-cooling the compressed air flow before entering the first exchanger, with the clear purpose of achieving energy saving because the heat amount which has to be removed from the compressed air flow in order to reach the related dew point, is reduced in direct function (even if not proportional) of the lowering of the air temperature at the first exchanger inlet; therefore the less heat is removed from the compressed air the less will be the energy required by the cooling circuit;

The second function consists in heating the compressed air exiting the second heat exchanger; in fact this air, just dehumidified, is usually at a very low temperature, and often not usable just for that reason, in fact it can cause icing, external condensation in other parts, etc.

Notoriously, said heating function is, in fact, given to the air flow entering the heat exchanger upstream the second exchanger, because said exchange function is completely advantageous for both air flows, and it is obtained without any energy costs, and rather the air pre-cooling makes it possible a certain energy saving as explained.

From patent EP 1 464 887 A1 it is known an apparatus for the dehumidification of a compressed damp air flow; it comprises a first exchanger and a second exchanger arranged vertically one on the other, and wherein between the two exchangers it is arranged a compartment 38 which besides isolating the two exchangers one from the other, above all, it lets the air flow coming from the second exchanger 30, and along the second channel 22 pass between said two heat exchangers so as to be able to pass again through the first heat exchanger 24, cooling in this way the incoming damp air, as explained above.

Anyway, the fact that the second channel 22 is completely adjacent to second heat exchanger gives rise to an easily identifiable inconvenience; in fact, the air which passes by said channel 22 is generally warmer than the wall which is in common with the second heat exchanger and, therefore, it tends to be slightly cooled.

This is negative from the point of view of the dehumidifier efficiency as this second heat exchanger is consequently heated albeit of a little. As a final consequence it reduces its energy efficiency, but, above all, it is completely unsatisfying for the purpose of achieving a very high reduction of the residual dampness.

From patent EP 1 293 242 A2 it is known a type of heat exchanger for compressed air provided with a path of the conduits, which carry the air flow to be dehumidified, passing through both a first heat exchanger working as explained above and that is as a "pre-cooler", and a second heat exchanger in thermal exchange relation, as usual, with a cooling circuit of the type known per se, usually an evaporator.

Patent EP 1 593 924 provides a type of dehumidifier with two heat exchangers substantially similar to the previous one, from which it differentiates only for a different architecture and geometry of the conduits of the various gases; it substantially has the same inconveniences as the previous one and, therefore, for brevity, its detailed discussion is avoided.

But the most serious inconvenience, which is common to all the above discussed patents, consists in that, even in the most favourable case that is when the conduits which form said two heat exchangers are arranged in counter-flow between them maximizing the thermal exchange efficiency, anyway, the residual dampness percentage cannot practically and conveniently be removed because a further reduction of the dampness would require a dehumidifier with rooms and higher costs in an exponential way, as it is well known to the skilled in the art.

To overcome such limit, patent EP 2 263 778 A1 shows how to realize an hybrid apparatus for the dehumidification of a compressed air flow and which comprises, besides a dehumidifier of the conventional type and similar to those of the patents discussed above, also a further dehumidification stage using hygroscopic and renewable means of absorption.

The solution herein described is certainly efficient and adequate in order to achieve a radical reduction of dampness, much higher than that which can be obtained with dehumidification apparatuses provided with heat exchangers only, as seen above.

Moreover, said solution is complicated and onerous from the constructive point of view as the two heat exchangers are practically separated and, therefore, little compact and so also with an inferior energetic efficiency; such limit is absolutely unacceptable in a highly competitive commodities sector as the one under discussion.

BRIEF SUMMARY

It would, therefore, be desirable, and it is the main object of the present invention, to provide an apparatus for dehumidification comprising both one or more dehumidification stages according to the prior art, and the possibility of connecting in a simple and easy way to an external apparatus for the dehumidification through a means apt of absorbing dampness which is compact and which can be made in a simple way with known materials and techniques that are easily and economically available.

Such purpose is achieved by a dehumidifier made according the appended claims.

BRIEF DESCRIPTION OF THE DRAWINGS

Characteristics and advantages of the invention will become apparent from the following description, including but not limited to, with reference to the appended drawings, wherein.

DETAILED DESCRIPTION

Continuing the description it may be used words such as "on", "under", "upwards", "downwards", "lower"; the person skilled in the art will not have any difficulties in understanding that such words are referred to the orientation of the apparatus in its usual working arrangement and as shown in the appended figures, and therefore these words, which do not cause misunderstandings in the person skilled in the art, are needed in order to explain and define the content of the invention more clearly and more simply.

Figure 1:
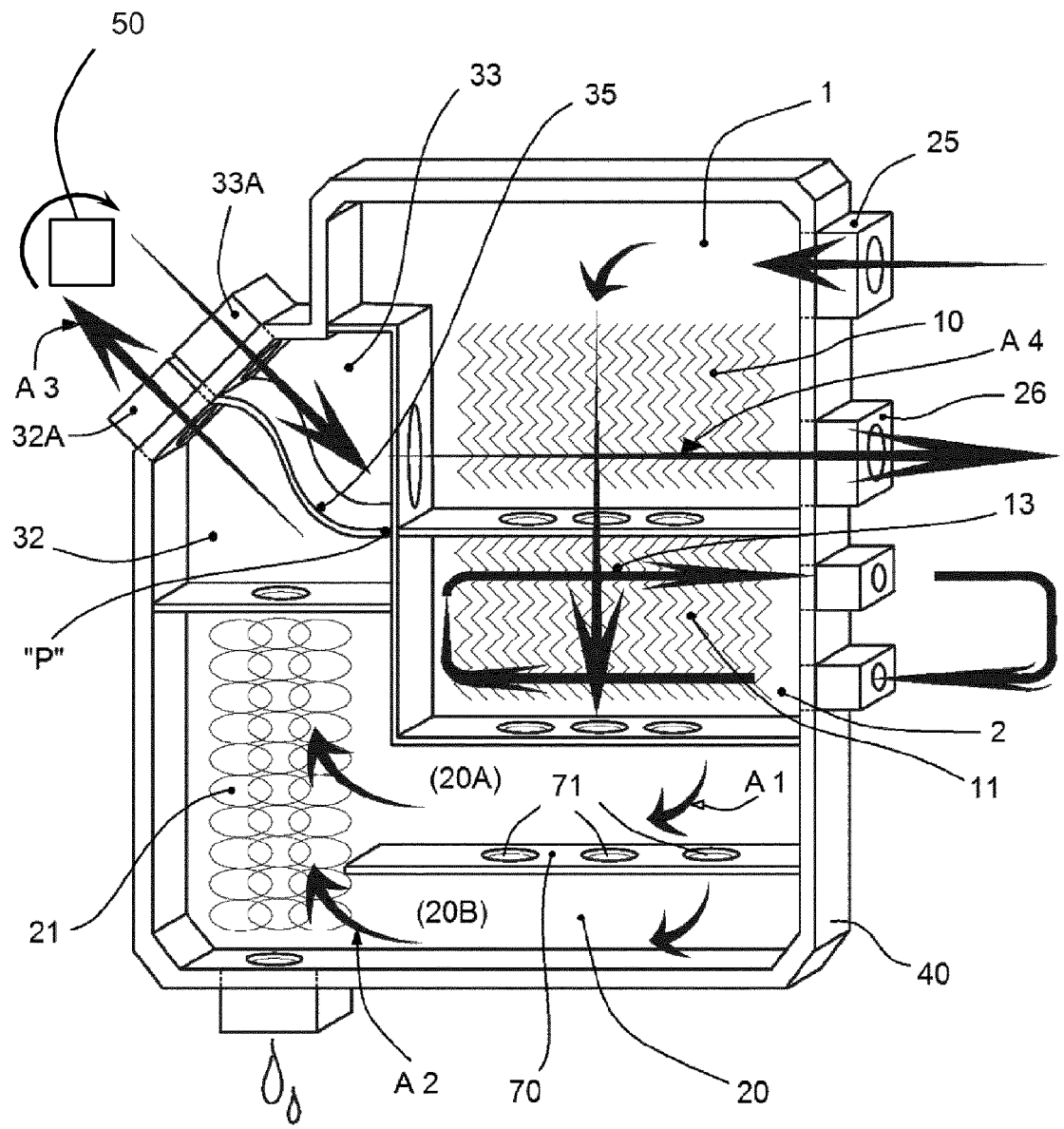
FIG. 1 shows a perspective and sectional plan view basically vertical of a type of apparatus for dehumidification according to the invention.

With reference to FIG. 1, an apparatus for dehumidification and post-heating a gas flow, preferably a compressed air flow, realized according to the prior art, comprises:

a first heat exchanger 1 for pre-cooling and successively heating said gas flow, and comprising two distinct conduit assemblies for the reciprocal heat exchange, wherein a first conduit assembly 10 is passed by said gas flow to be dried, and a second assembly 12 passed by said gas flow already dried;

a second heat exchanger 2 arranged downstream of said first heat exchanger 1 and apt of cooling said gas flow and of condensing the dampness therein contained, and comprising:

a third conduit assembly 11 passed by said gas flow to be dried and coming from said first conduits 10, a fourth conduit assembly 13 thermally associated to said third assembly 11, and able of being supplied and passed by a refrigerating flow (B) and of conveying it to the relevant outlet; normally said fourth conduit assembly is the evaporator of a refrigerating circuit of the known type and arranged outside said fourth assembly 13, a collection chamber 20, formed by an empty chamber and able of collecting the dampness contained in said gas, and arranged in the gas flow downstream of said second heat exchanger 2.

Said first and second heat exchanger, and said collection chamber 20, are contained in a common outer box 40.

The path of the gas to be dried is symbolically represented by the arrow "A" in the appended figures.

With reference to figures from 1 to 8, the first heat exchanger 1 is formed in the known way and the first conduit assembly 10 is passed by said gas flow to be dried, from a relative inlet port 25 through said box 40, and the second conduit assembly 12 is passed by said gas flow already dried and is directed towards a relative outlet port 26 passing through the same outer box 40.

Said assemblies are of the traditional type, and each of the relative conduits 10 and 21 form an element with a plan development, generally thin and basically a radiator; further said conduits 10 and 12 are a plurality, and are arranged in contact and alternately between them, so as to enhance the reciprocal thermal exchange, in the known way.

The second heat exchanger 2 is formed in a completely similar way; each of the relative conduits of assemblies 11 and 13 formed by an element with a plan development, generally thin and substantially a radiator; moreover, said conduits 12, 13 are a plurality, and are arranged in contact and alternately between them, so as to enhance the reciprocal thermal exchange, in the known way.

Each conduit 12 is simply the continuation of a respective conduit 10, and therefore it is passed by the same gas flow to be dried, while each fourth conduit 13 is passed by the refrigerating flow. Generally the collection chamber 20 therefore is functionally a part of the conduit of the dried gas.

According to the prior art, in order to make the flow of the dried air return to the first heat exchanger 1, it is realized a return path from said collection chamber 20, or from a contiguous area downstream of said heat exchanger 2, which directs said flow directly to the inlet of the first exchanger 1, but of course in the opposite direction, and therefore from the opposite side with respect to the side wherefrom the damp air enters.

Anyway with the purpose of avoiding the mentioned limit, —and that is that such dehumidifier is not able of achieving, in an economical way, an enhanced dehumidification of the treated gas, normally a compressed air flow, downstream of said collection chamber 20 contiguous to said second heat exchanger 2—it is arranged a second chamber 32 connected to the outside by a respective emission mouth 32A passing by a wall portion of said box 40.

From said emission mouth 32A a conduit extends reaching means 50 apt of further sensibly drying the gas getting thereto.

Said means 50 are not part of the present invention, and therefore they are not particularly described; it will be sufficient to clarify that said means 50 are devices, or systems, apt of over-drying the air flow passing through them, and which ideally are formed by apparatuses comprising elements apt of radically absorbing the dampness; for example they are formed by the system shown in said patent EP 2 263 778 A1.

The air flow then passes by said means 50 and flows through a further conduit until it reaches an inlet mouth 33A which again passes through, but in the opposite direction, the outer box 40, beyond which a third chamber 33 is arranged; this is not communicating to said second chamber 32, while, on the contrary, it is communicating, in the known manner, to the conduits of said second assembly 12, which supplies with the transported air flow and already completely dried.

Finally from said conduits 12 the gas flow exits outside through said outlet port 26.

Figure 2:
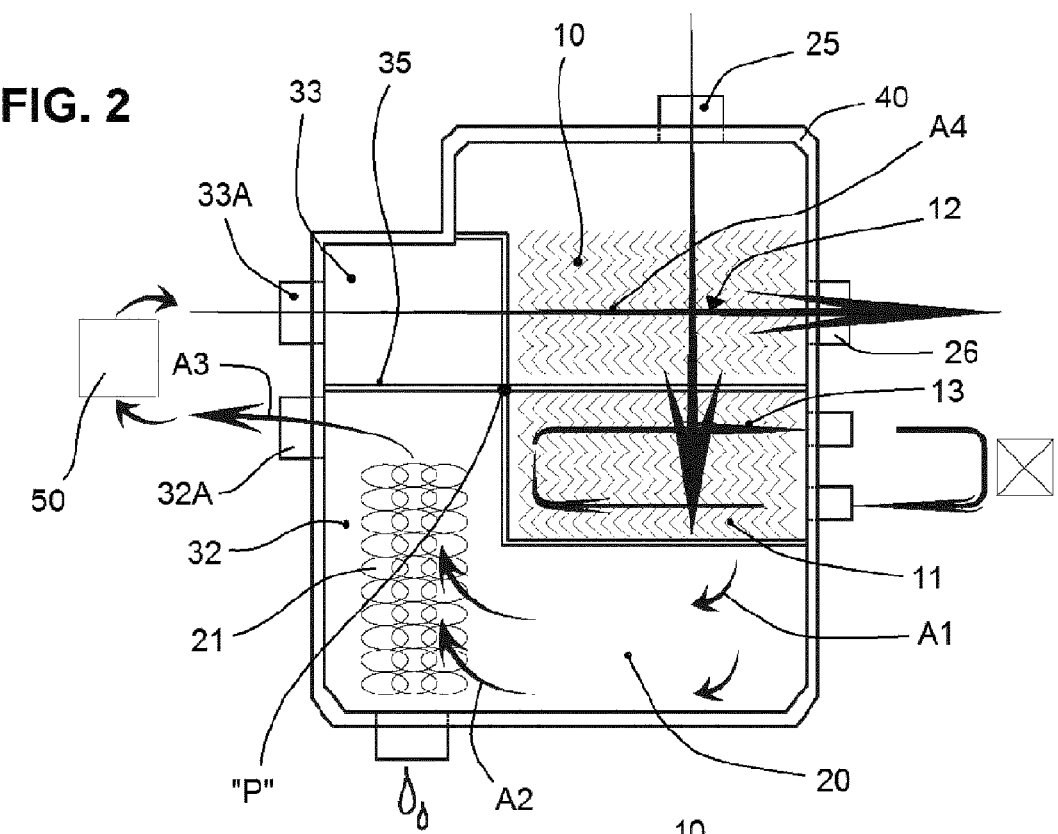
FIG. 2 shows a plan, vertical, and cross-sectional view of a second form of embodiment of an apparatus according to the invention, Figures from 3 to 8 show respective views, similar to FIG. 2, of corresponding and different forms of embodiment of the apparatus according to the invention.

De facto it is formed, as shown in FIG. 2, a return path from said second heat exchanger 2 to said first heat exchanger 1 which also comprises:

a first leg (A1) which crosses at least partially said collection chamber 20, a second leg (A2) which crosses said second chamber 32 and which then passes through the emission mouth 32A, a third leg (A3) branching out from said emission mouth 32A to said inlet mouth 33A across further de-humidifying means 50, a fourth leg (A4) passing through said third chamber 33, wherefrom the gas flow again enters the first heat exchanger 1.

Basically, the invention consists in realizing a type of dehumidifier which makes it possible to add, inserting it between two heat exchangers of the traditional type 1 and 2, also a further part which provides a specific and strong dehumidifying action.

The invention, just described in general terms, enables some improvements and specifications from the point of view of the complete dehumidifier structure.

Figure 3:
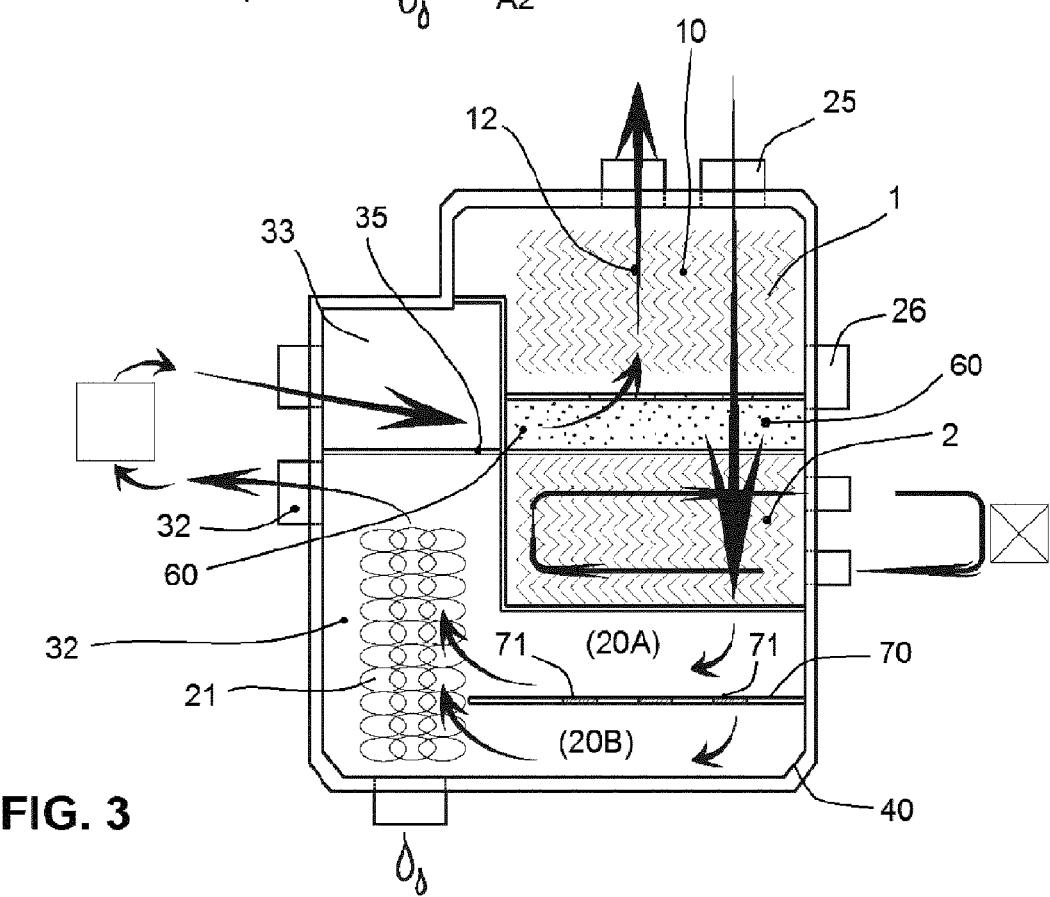
Figure 4:
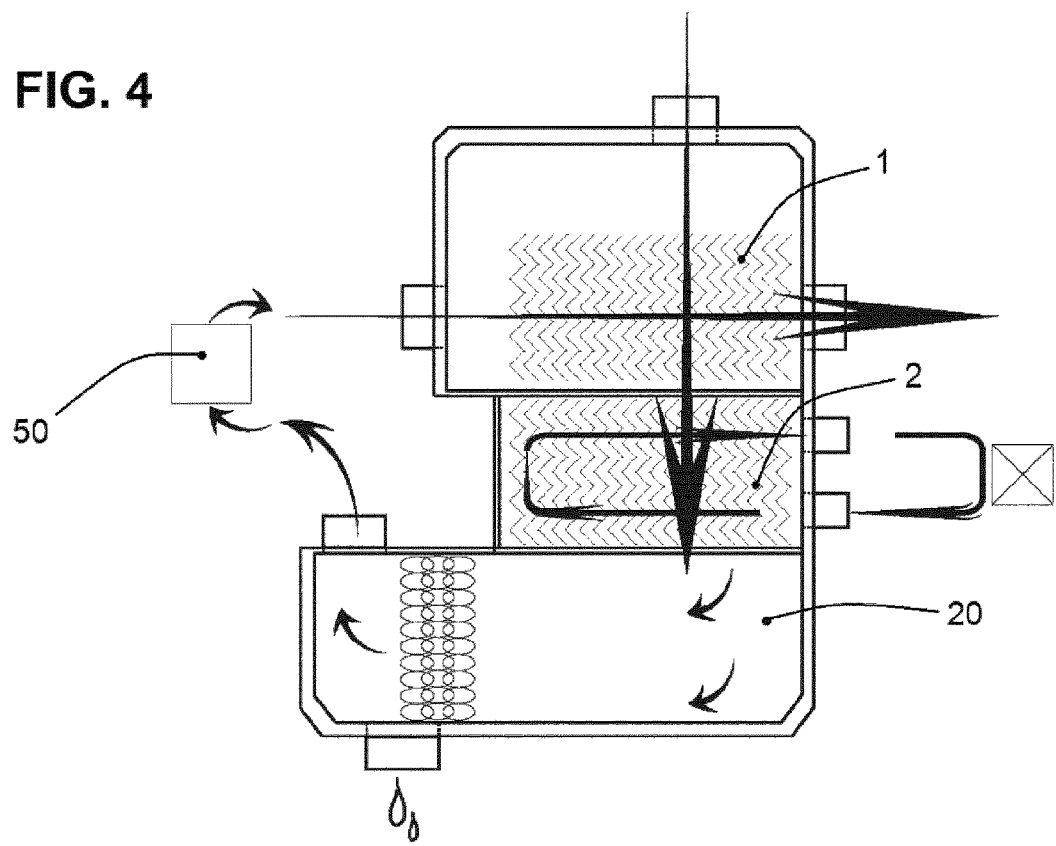

1) A first and advantageous characteristic consists in the fact that, as shown for ex. in FIGS. 1, 2 and 3, said third chamber 33 is included inside said box 40, and it is separated with respect to said chamber 32 by means of a common interposed hermetic wall; in fact, such characteristic improves the compactness of the assembly and it reduces its production costs.

Figure 5:
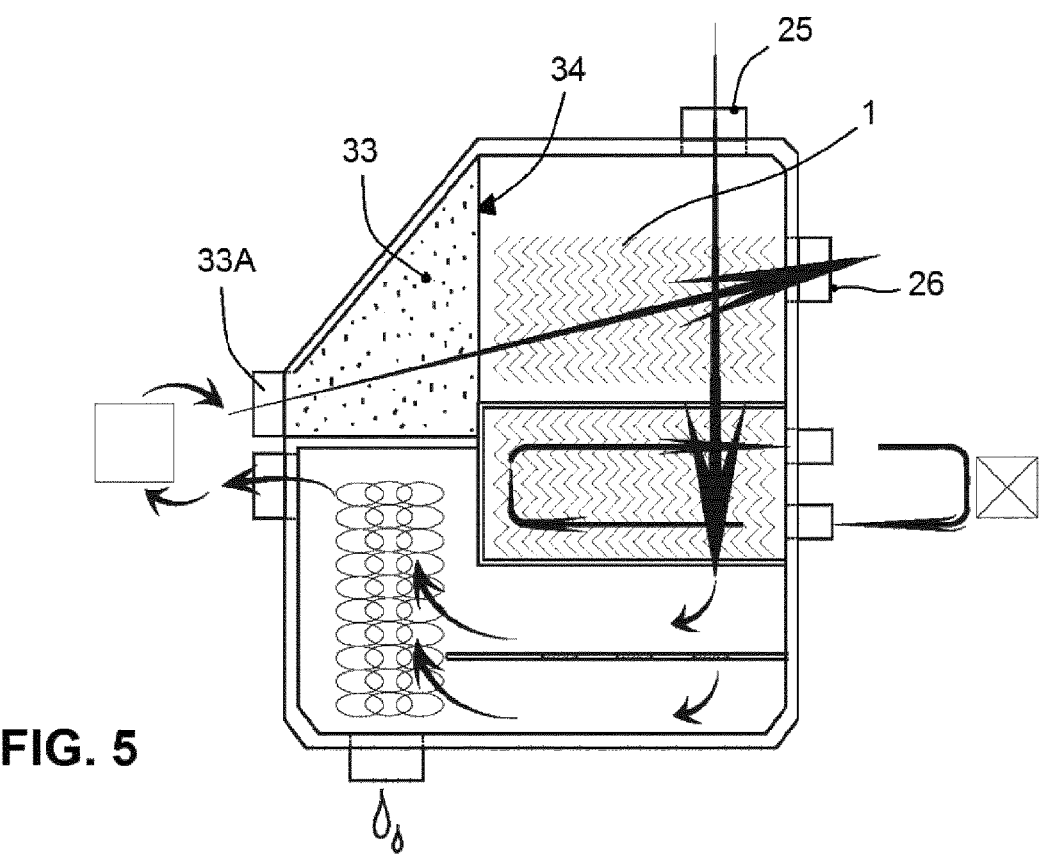

2) A second characteristic consists in the fact that, with reference to FIG. 5, said third chamber 33 shows a substantially triangular or flared shape, and that the related inlet mouth 33A is placed on the portion of said box which defines said third chamber 33 and that is substantially opposed to the communicating face 34 to said first heat exchanger 1.

In fact the return area of the gas again inside the first exchanger is basically in a limited part and near the second heat exchanger, and therefore it is useless to enlarge the third chamber 33 with rooms which are not passed through by the gas and therefore they are not needed.

Figure 6:
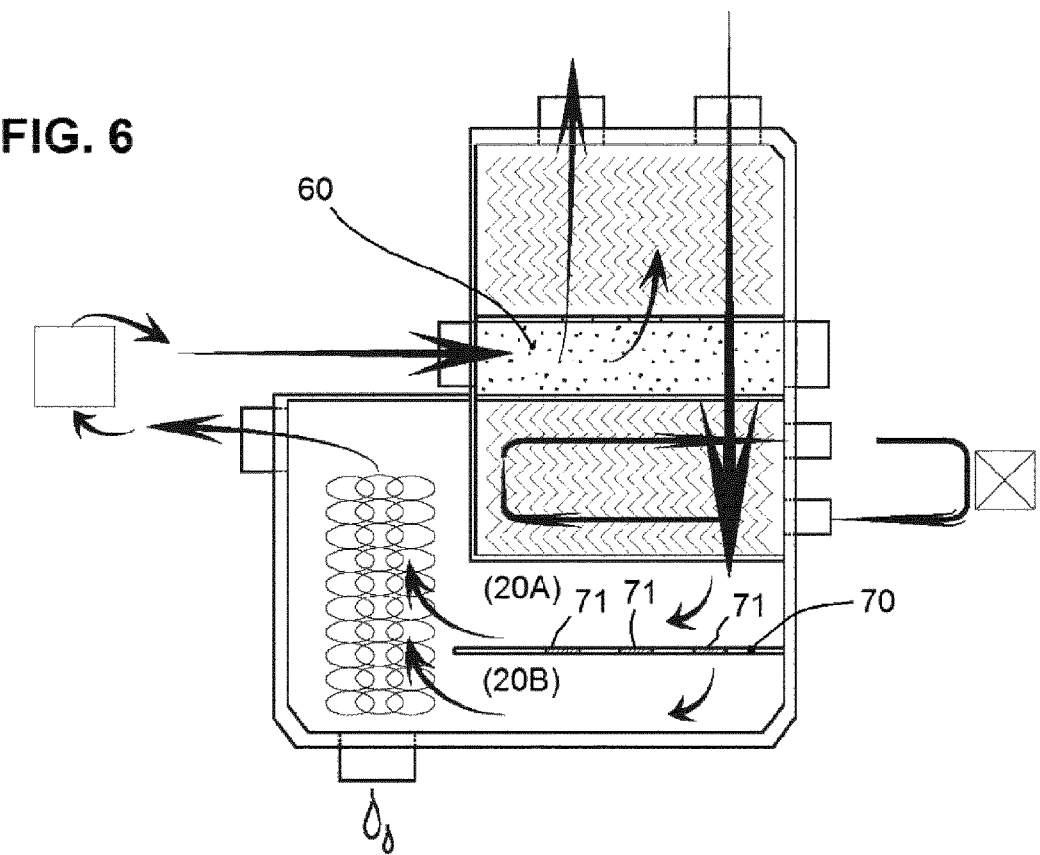

3) A further improvement consists in the fact that, with reference to FIGS. 3 and 6, the conduits of said second assembly 12 are oriented in a basically counter-flow way to the conduits of said first assembly 10.

In fact, it is well known to whom is skilled in the art, that the thermal exchange between two counter-flow means is much more efficient in relation with crossed-flow thermal exchange, as shown in FIGS. 1, 2, 4 and 5; anyway in order to make this possible, between the first exchanger 1 and the second heat exchanger 2 a transit portion 60 is arranged made of an empty room and formed so as to be opened towards said third chamber 33 (see FIG. 33), so as the gas can flow into it freely, and also opened towards the conduits of the second assembly 12, i.e. the conduits which spread out the gas towards the outlet port 26.

In this way the dried gas flows from the third chamber 33 towards the inside of said transit portion 60, through which it is made possible that the gas is subdivided into a plurality of separated and parallel flows which enter the relative conduits of the second assembly 12, and, therefore, towards the outlet port 26.

4) With reference to all the figures, it will be apparent that the first exchanger 1, the second exchanger 2 and said collection chamber 20 are arranged vertically one on the other so as to facilitate the flow both of the gas to be dried avoiding unwanted load losses which can be caused by curved paths, and above all, to facilitate, due to gravity, the flow of the condensed fluid which is automatically and naturally collected in the underneath collection chamber 20.

A very simplified variation of such solution is shown in FIG. 6, wherein said third chamber is completely removed, and the conduit coming from said means 50 enters directly into said transit portion 60.

5) Furthermore it is advantageous that said third chamber 33 is substantially flanked by said first heat exchanger 1 so as to facilitate the gas flow from said chamber 33 to said first heat exchanger 1; the two forms of embodiment shown in FIGS. 6 and 8 make an exception to this advantageous improvement due to their constructive peculiarity and for reasons which will be explained later.

6) A further improvement consists in what follows; with reference to FIGS. 1, 2 and 3, a portion of said collection chamber is extended horizontally externally to the vertical projection of the two heat exchangers 1 and 2, and said horizontal portion of said collection chamber 20 continues, but vertically and upward, with a second chamber 32.

The advantage of such solution essentially consists in that said second chamber 32 can easily form part of a return path from said collection chamber 20 generally towards the first heat exchanger 1.

Moreover, at the upper end of said second chamber 32, it is arranged an emission mouth 32A, which forms a passage between said second chamber and the outside, typically a channel, shown only by clear arrows, which feeds said outer dehumidifying means 50.

The fact that said emission mouth 32A is arranged above, on the upper portion of said second vertical chamber 32, enables to absolutely avoid that the fluid present on the bottom of the chamber 20 could be drawn upward by the gas flow, then preventing it from reaching the mouth 32A itself.

7) A further improvement, favoured by the previous one, consists in the fact that in said second chamber 32A a means 21 is arranged which is apt of intercepting or of favouring the interception of the dampness, already condensed but not materially separated from the gas itself.

Said means, typically a porous means, or a means of a very fine mesh, such as a very fine wire mesh, also known as "DEMISTER", is placed and laid vertically along the vertical path of said second chamber 32, so as to make the most of the vertical path of the chamber itself, and therefore to have the maximum extension possible, and so more favourable.

Figure 7:
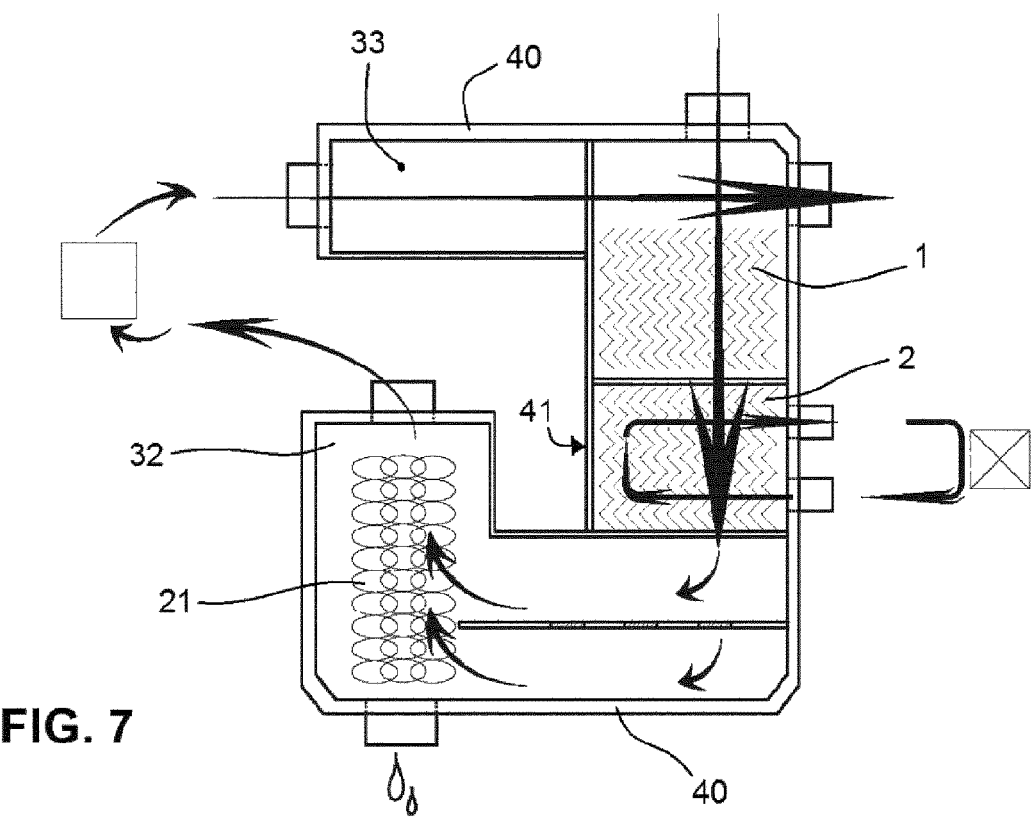

8) A further improvement is schematically shown in FIG. 7 where it is shown that the second chamber 32, and the third chamber 33, are at least mechanically separated from the second heat exchanger 2; this is more concretely done by keeping said two chambers 32 and 33 separated from the wall 41 which is that portion of the box 40 which includes, and delimits on one side, the second heat exchanger 2.

The advantage of such solution lies in the fact that the air which goes into said second chamber 32 is normally warmer, albeit only a little, than the average temperature in the second heat exchanger 2 and if this and the second chamber are adjacent and in contact with a common surface, this of course warms it up a little; of course this fact reduces its efficiency, because logically the average temperature of the heat exchanger 2 has to be as low as possible. The foregoing explains the advantage of having the second chamber 32 and the third chamber 33, at least partially separated from the second heat exchanger 2.

9) Another advantageous improvement, already apparent in the figures, consists in that said outer box 40 includes inside it all the chambers, devices, and exchangers as described; in particular the emission mouth 32A is arranged so as to enable the passage through the outer box 40. This fact of course improves the efficiency of the entire apparatus, and above all it increases its compactness reducing its production costs.

10) A further improvement, which can be associated with the previous one, and with particular reference to FIGS. 1, 3 and 5, emerges from the fact that, in order to further improve the compactness of the entire apparatus, said two heat exchangers 1, 2, said chamber 32 and said third chamber 33 are radially arranged around a common straight line; because of the particular configuration of the figures, drawn according to a plane orthogonal to said straight line, this is shown by point "P" in FIGS. 1 and 2.

11) With reference to FIGS. 1, 3 and 6 it has been devised a useful improvement in the fact that said collection chamber 20 is formed by at least two distinct rooms wherein one room 20A overlaps the other room 20B, which are delimited by a common separation wall 70 which is substantially horizontal and provided with a plurality of holes 71.

In fact, it has been noticed that such a configuration, which practically forms a "pre-demister", highly contributes in intercepting and therefore in condensing most of the dampness, even though its working surface is flat with only some large holes to let the gas pass through.

In fact, such "pre-condensation" of the gas dampest parts makes it possible not to saturate, with an excessive dampness, the demister which is downstream, and in the second chamber 32, leaving to it the task of intercepting the gas with a lesser relative dampness, and therefore with a greater overall efficiency.

Figure 8:
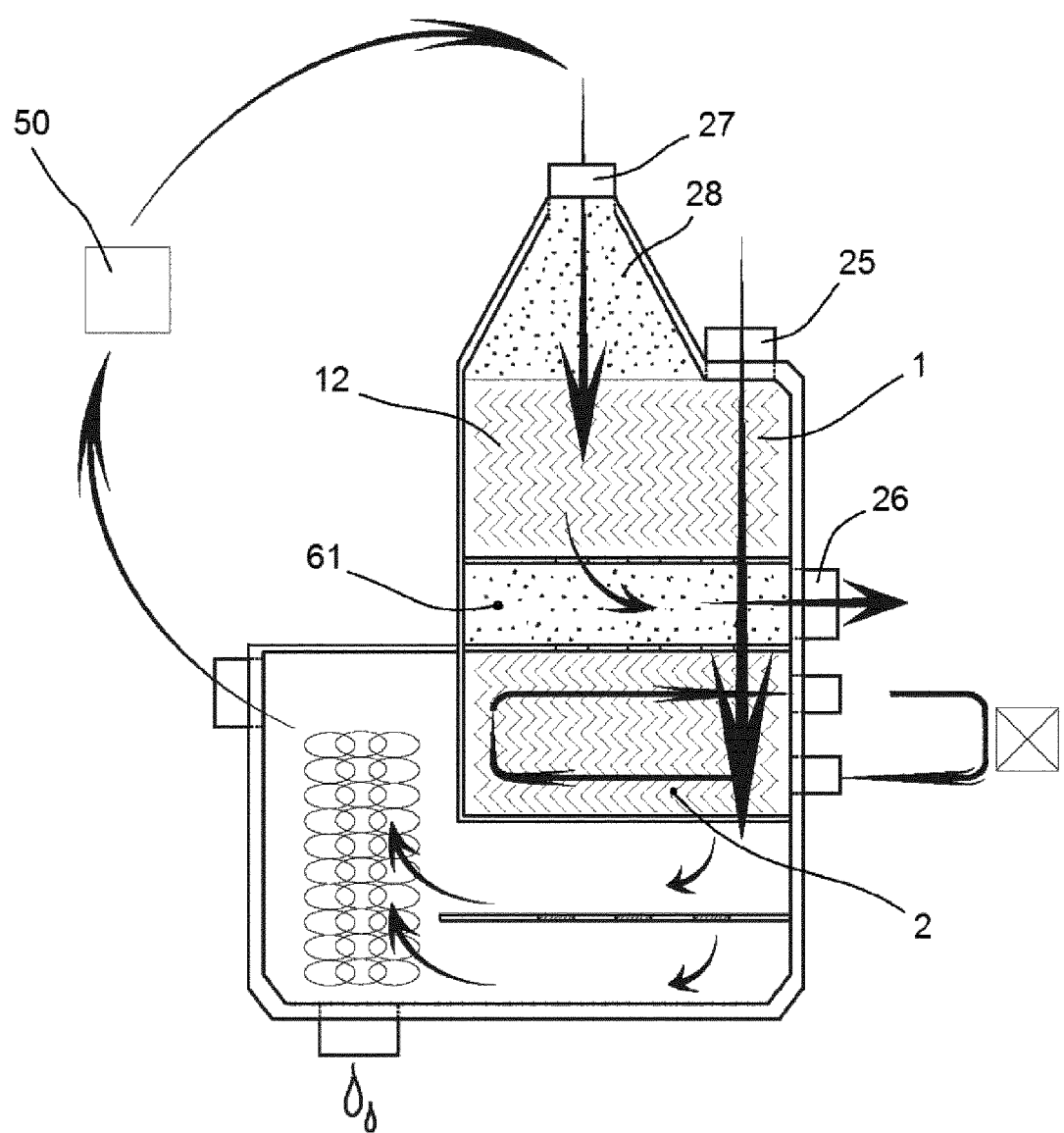

12) With reference to FIG. 8, a further form of embodiment, which sometimes can have a great importance, consists in that, from the outer dehumidifier means 50, the gas enters again the first exchanger 1 not through said third chamber 33, which now is abolished, but enters the exchanger 1 directly from a third port 27 from the same side of the outer box 40 wherein also the inlet port 25 is arranged; said gas therefore passes through the conduits of the second assembly 12 as an "equal-flow" with relation to the conduits of the first conduit assembly 10, and exits passing through the transit portion 61, similar to the previous portion 60, formed by an empty room but in this case formed so as to be open also towards the conduits of the third assembly 12, that is the conduits which transport the gas from said port 27, and finally exiting outside passing through the related exit port 26.

Even though, notoriously, such "equal-flow" way is not ideal for the best heat exchange, yet it can be really advantageous when for constructive, encumbrance or assembly reasons, it is not possible to mount said third chamber 33 laterally.

Advantageously, in order to improve the gas flow from said port 27 to the conduits of the third assembly 12, between said port 27 and said conduits of assembly 12, it is arranged a suitable chamber 28 which works as a diffuser of the gas entering the conduits of assembly 12.

The invention claimed is:

1. An apparatus for dehumidification of an air flow, comprising: an outer box provided with an inlet port for damp air inlet, and with an outlet port for outlet of de-humidified air, a first heat exchanger for pre-cooling and successively heating said air flow, and comprising two distinct and separate conduit assemblies for reciprocal heat exchange, wherein a first conduit assembly is passed by said damp air flow coming from said inlet port, and a second assembly is passed by said de-humidified air flow and is directed to said outlet port, a second heat exchanger arranged downstream of said first heat exchanger and apt of cooling said air flow and of condensing dampness therein contained, and comprising: a third conduit assembly passed by said air flow to be dried and coming from said first conduits, a fourth conduit assembly thermally associated to said third assembly, and able of being supplied with a refrigerating flow and of conveying the refrigerating flow to a refrigerant flow outlet, a collecting chamber able of intercepting and collecting the dampness of said air flow condensed inside said second heat exchanger, and arranged downstream of said second heat exchanger, wherein the apparatus for dehumidification also includes: a second chamber downstream of said collecting chamber, contiguous to said second heat exchanger and connected to the outside by a respective emission mouth, a third chamber: a) not communicating to said second chamber, b) connected to the conduits of said second assembly, c) connected to the outside of said outer box by a respective inlet mouth, able of implementing a return path from said second heat exchanger and said first heat exchanger which also comprises: a first leg which at least partially crosses said collection chamber, a second leg which passes through said second chamber and which then passes through said emission mouth, a third leg branching out from said emission mouth to said inlet mouth across a dehumidifier, a fourth leg passing through said third chamber.

2. The apparatus according to claim 1, wherein said third chamber is separated from said second chamber by a common interposed hermetic wall.

3. The apparatus according to claim 1, wherein said third chamber shows a substantially triangular or flared shape, and said inlet mouth is placed on a portion of said third chamber opposed to a communicating face to said first heat exchanger.

4. The apparatus according to claim 1, wherein: the conduits of said second assembly are oriented in a counter-flow direction to the conduits of said second assembly, and between said first and second heat exchangers a transit portion is arranged, working as a diffuser which spreads out the air flow towards the conduits oriented upwards of said second conduit assembly.

5. The apparatus according to claim 4, wherein said third chamber is substantially flanked by said first heat exchanger.

6. The apparatus according to claim 1, wherein said second chamber stretches in a substantially vertical path between an end portion of said collecting chamber and said emission mouth.

7. The apparatus according to claim 1, wherein inside said second chamber a porous member is arranged, which is apt of letting said air flow to pass, and of intercepting the therein contained dampness, and said emission mouth is placed downstream of said porous member, and especially above it.

8. The apparatus according to claim 1, wherein said second chamber and said third chamber are at least partially separated by a wall of said outer box which is adjacent to said second heat exchangers.

9. The apparatus according to claim 1, wherein: said second chamber, said third chamber and said collection chamber are included in said outer box, said second chamber is connected to the outside of said outer box by said emission mouth, and said two heat exchanger, said second chamber and said third chamber are radially arranged around a common point.

10. The apparatus according to claim 1, wherein the apparatus further comprises: a third port which enters a diffuser able of distributing equal-flow of the air introduced into said third port into said conduit of said second assembly, a transit portion interposed between said first and second heat exchangers, and apt of receiving the air flow coming from said conduits of said second assembly and of allowing passage of the air flow into said outlet port.

11. The apparatus according to claim 1, wherein said collection chamber is formed by at least two distinct rooms, wherein one room overlaps the other room, said two rooms being reciprocally delimited by a common separation wall which is substantially horizontal and provided with a plurality of holes.

* * * * *